(12) United States Patent
Holbrook et al.

(10) Patent No.: US 9,367,251 B2
(45) Date of Patent: Jun. 14, 2016

(54) SYSTEM AND METHOD OF A SHARED MEMORY HASH TABLE WITH NOTIFICATIONS

(71) Applicants: Hugh W. Holbrook, Santa Clara, CA (US); Duncan Stuart Ritchie, Bowen Island (CA); Sebastian Sapa, Vancouver (CA); Simon Francis Capper, San Jose, CA (US)

(72) Inventors: Hugh W. Holbrook, Santa Clara, CA (US); Duncan Stuart Ritchie, Bowen Island (CA); Sebastian Sapa, Vancouver (CA); Simon Francis Capper, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 213 days.

(21) Appl. No.: 14/270,226

(22) Filed: May 5, 2014

(65) Prior Publication Data

US 2014/0359232 A1 Dec. 4, 2014

Related U.S. Application Data

(60) Provisional application No. 61/822,261, filed on May 10, 2013.

(51) Int. Cl.
*G06F 17/30* (2006.01)
*H04L 12/743* (2013.01)
*G06F 3/06* (2006.01)

(52) U.S. Cl.
CPC .............. *G06F 3/0614* (2013.01); *G06F 3/067* (2013.01); *G06F 3/0655* (2013.01); *G06F 17/30348* (2013.01); *H04L 45/7453* (2013.01)

(58) Field of Classification Search
CPC ................... G06F 17/30097; G06F 17/30168; G06F 17/30171; G06F 17/3023; G06F 12/1027; G06F 17/30348; H04L 45/7453
See application file for complete search history.

(56) References Cited

U.S. PATENT DOCUMENTS

| | | | | |
|---|---|---|---|---|
| 6,014,730 A | * | 1/2000 | Ohtsu | G06F 9/52 711/130 |
| 7,516,196 B1 | * | 4/2009 | Madan | G06F 17/30899 709/219 |
| 8,099,538 B2 | * | 1/2012 | Saha | G06F 9/526 710/200 |
| 2007/0233710 A1 | * | 10/2007 | Passey | G06F 9/542 |
| 2014/0025898 A1 | * | 1/2014 | Iyengar | G06F 12/084 711/130 |

OTHER PUBLICATIONS

Sullivan, Mark, et al. "Using Write Protected Data Structures to Improve Software Fault Tolerance in Highly Available Database Management Systems", Proceedings of the $17_{th}$ International Conference on Large Data Bases, Sep. 1, 1991, pp. 171-180, XP055141954, http://www.vldb.org/conf/1991/P171.PDF, Barcelona, Spain.
Extended European Search Report for Counterpart European Patent Application No. 14167803.7, dated Oct. 7, 2014.

\* cited by examiner

*Primary Examiner* — Edward Dudek, Jr.
(74) *Attorney, Agent, or Firm* — Blakely, Sokoloff, Taylor & Zafman LLP

(57) ABSTRACT

A method and apparatus of a device that includes a shared memory hash table that notifies one or more readers of changes to the shared memory hash table is described. In an exemplary embodiment, a device modifies a value in the shared memory hash table, where the value has a corresponding key. The device further stores a notification in a notification queue that indicates the value has changed. In addition, the device invalidates a previous entry in the notification queue that indicates the value has been modified. The device signals to the reader that a notification is ready to be processed.

20 Claims, 17 Drawing Sheets

SYSTEM AND METHOD OF A SHARED MEMORY HASH TABLE WITH NOTIFICATIONS

FIELD OF INVENTION

This invention relates generally to data networking and more particularly storing a hash table in shared memory in which the shared memory hash table can notify readers of updates to the shared memory hash table.

BACKGROUND OF THE INVENTION

A network element can include two different planes that are used to process network traffic, a control plane and a data plane. The data plane receives, processes, and forwards network traffic using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The control plane gathers the configuration data from different sources (e.g., locally stored configuration data, via a command line interface, or other management channel such as Simple Network Management Protocol (SNMP)) and configures the data plane using the configuration data.

In addition, the control plane will store the configuration data in one or more tables. For example, the network element will store the routing information in a routing table that is used by the data plane. The data plane can further include multiple different hardware forwarding engines. Each of these hardware forwarding engines will use the configuration data from these tables by reading the tables in the control plane and updating local copies of the tables for each of the hardware forwarding engines. The control plane includes a writer that writes the configuration data, where multiple readers for the hardware forwarding engines read this data. A problem that can arise is that one of the multiple readers attempts to read data from one of the tables that the writer is currently updating. For example, if a reader reads data that is concurrently being modified by the writer, the reader may read data that is partially updated and, thus, is not valid data that is usable by the reader.

In addition, the readers are useful for building asynchronous, distributed, cooperating agents. Agent logic is triggered upon receipt of attribute notifications delivered via the reader from tables, producing further state changes for other services that correspond to this agent. The attribute notifications can include updated configuration data for an agent that describes an aspect of a state of the originating agent. The tables are a central clearinghouse of state, responsible for storage and delivery to the readers and corresponding agents and services. This notification model is a useful mechanism for distributed software development. For example, one way to use notifications is to build a queue in which every change is recorded as a "key" within the table and its new associated value. However, the performance of this type of implementation supports only limited sized tables. For example, the notification model can adequately support routing tables with up to 16,000 routes and updating 8-10 readers. This model, however, may not be able to support tables up to one million routes and 32 readers.

SUMMARY OF THE DESCRIPTION

A method and apparatus of a device that includes a shared memory hash table that notifies one or more readers of changes to the shared memory hash table is described. In an exemplary embodiment, a device modifies a value in the shared memory hash table, where the value has a corresponding key. The device further stores a notification in a notification queue that indicates the value has changed. In addition, the device invalidates a previous entry in the notification queue that indicates the value has been modified. The device signals to the reader that a notification is ready to be processed.

In another embodiment, the device receives a signal that a notification is available in the notification queue, where the notification indicates that the value has been modified and the value has a corresponding key. The device further determines an entry in the notification queue for the value, where one or more previous entries in the notification queue corresponding to the key have been invalidated. In addition, the device modifies the local copy of the value based on comparing the value in the shared memory hash table and the local copy of the value.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
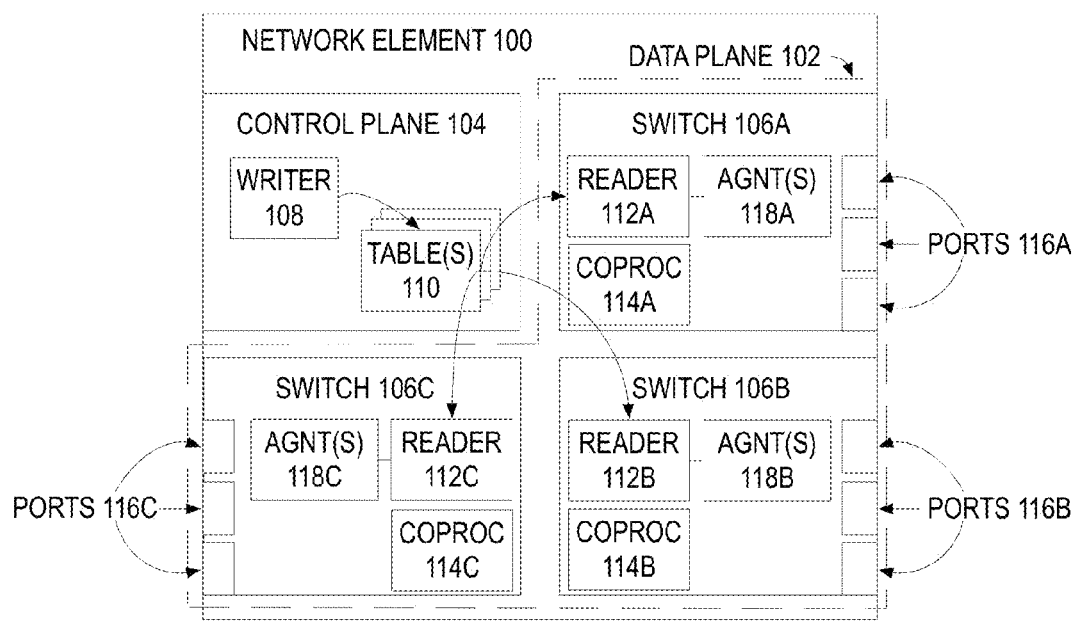
FIG. 1 is a block diagram of one embodiment of a network element that includes a shared memory hash table with notifications to readers for updates.

A method and apparatus of a device that includes a shared memory hash table with notifications to readers for updates is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that includes a shared memory hash table with notifications to readers for updates is described. In one embodiment, the shared memory hash table with notification provides a mechanism for stateful sharing of tabular data between a writer and multiple readers in a network element. This shared memory hash table is intended to accelerate data collections (e.g., routing tables, address tables, etc.) with high frequency update rates. In addition, the shared memory hash table can provide high availability and fault tolerance.

In one embodiment, the shared memory hash table with notification can accelerate a targeted number of collections that are very large, have high update rates, and a relatively large numbers of readers (e.g., a routing table with 1 million entries, a Media Access Control (MAC) address table with 288 k entries and 16 to 32 readers). In one embodiment, the shared memory hash table notifications operate on the principle of coalescing the notification. In this embodiment, the writers and readers operate independently by running at their own speed, within bounded memory and with an O(1) complexity. In addition, concurrency is handled via wait-free and lock-free data protocols by using 64-bit atomic load/store operations. In this embodiment, atomic read-modify-write variants are not needed. Furthermore, the shared memory hash table does not utilize shared locks, which allows linear scaling of throughput over multiple CPUs as more readers and writers are added.

In one embodiment, the shared memory hash table with notifications does not have a central controlling Agent. Instead, each writer manages a corresponding shared memory hash table, independent of other shared memory hash tables. If a writer restarts, the writer state is validated and reconciled from shared memory and the execution of the writer resumes. In one embodiment, the throughput of modified values from a writer to multiple readers scales linearly as readers and writers are added. In this embodiment, there is no blocking synchronization required by the participants, and the threads of execution are lock-free and wait-free. In one embodiment, writes to the shared memory hash table are coalesced in-place. In this embodiment, a fast writer does not block or consume unbounded memory because of slow or stuck readers. In addition, writers operate independently of the progress or the state of the readers, and vice versa. In one embodiment, the granularity of change notification is a compound value type consisting of multiple individual attributes value type rather than individual attributes. Thus, the maximum number of notifications that can ever be queued at once is bounded to the number of elements in the table.

In one embodiment, the shared memory hash table mechanism is comprised of three main components: the shared memory hash table, the notification queue, and the reader's local shadow table. The writer modifies an entry in the hash table and puts a notification in the notification queue. Readers pull the notification from the queue and populate their local shadow table. In turn, each reader modifies a corresponding agent's value collection.

In one embodiment, the hash table notification mechanism is based on the notification of slot identifiers ("slot-ids"), not keys. In one embodiment, a slot is a placeholder for a (key, value) pair. In this embodiment, the (key, value) pairs can come and go in a slot, but the slot-id remains the same. Thus, a notification on a slot indicates to a reader that something in this slot changed and it is up to the reader to figure out the change. Using this slot analogy for the shared memory hash table, each entry in the shared memory hash table is assigned a slot. So to deliver a notification that a table entry has changed, the writer that modified the table entry delivers the slot identifier. When a reader receives the slot identifier, the slot entry for this slot identifier indexes directly into the shared memory hash table to see what changed. In one embodiment, the use of slots to index the shared memory hash table is space and cycle efficient, because slot identifiers are simple 32-bit data, compared to an arbitrary size for the key.

In one embodiment, given that each shared memory hash table entry corresponds to a slot identifier, the writer can build a notification queue containing slot identifier notifications. In one embodiment, this is the notification queue as described below. In this embodiment, the reader follows this queue and consumes slot identifier notifications, reading the value from the corresponding slot and updating a reader-local shadow copy of the shared memory hash table. These key notifications can then be delivered to the agent.

As will be described below, in one embodiment, the values table, slot identifier and notification queue management is straightforward and is of O(1) complexity. In this embodiment, a single notification queue is used to service any number of readers.

FIG. 1 is a block diagram of one embodiment of a network element 100 that includes a shared memory hash table with notifications to readers for updates. In FIG. 1, the network element 100 includes a data plane 102 and a control plane 104. In one embodiment, the data plane 102 receives, processes, and forwards network data using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The data plane 102 includes multiple switches 106A-C, where each switch 106A-C receives, processes, and/or forwards network traffic. In one embodiment, each switch includes an ASIC that is coupled to one or more ports. For example and in one embodiment, the network element 100 is a single logical switch the includes multiple ASICs, where each ASIC is coupled to multiple ports. In this example, each switch 106A-C includes one ASIC and multiple ports (e.g., 24 ports/ASIC). In one embodiment, each switch 106A-C includes a reader 112A-C, co-processor 114A-C, ports 116A-C, and agent(s) 118A-C, respectively. In one embodiment, the reader 112A-C reads the data in the tables 110 and stores the data in a local buffer (not illustrated) of the respective switch 106A-C. In this embodiment, each reader 112A-C is notified of new data modification, and the corresponding reader 112A-C performs lock-free reads of the data so as to not read data that is in the middle of being modified. Performing a read of a table as a result of being notified is further described in FIGS. 8A-11B below. In one embodiment, the co-processor 114A-C is a processor for each switch 106A-C that can be used to accelerate various functions of the switch 114A-C. For example and in one embodiment, the co-processor 114A-C can accelerate bulk reads and write from memory in the control plane 104 to the local buffers. In one embodiment, the ports 116A-C are used to receive and transmit network traffic. The ports 116A-C can be the same or different physical media (e.g., copper, optical, wireless and/or another physical media). In one embodiment, each of the agent(s) 118A-C is a component of software that reads the configuration database, interacts with some resource (hardware or a network protocol or some other software component or agent, e.g. the operating system kernel), and produces a status of that resource.

In one embodiment, the control plane 104 gathers the configuration data from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and writes this configuration data to one or more tables 110. In one embodiment, the control plane 104 includes a writer 108 that writes configuration data to the table(s) 110 by performing wait-free writes and reader notifications, such that a reader reading the data can read data that is not in the middle of being modified. Performing a wait-free write of a table with reader notification is further described in FIGS. 8A-11A below.

In one embodiment, each of the one or more tables 110 is a hash table that is shared between the writer 108 and the readers 112A-C. In this embodiment, the table(s) 110 are stored in memory that is shared between the data plane 102 and the control plane 104. In one embodiment, the tables 110 store configuration data (e.g., forwarding, security, quality of service (QoS), and other network traffic processing information). In this embodiment, the writer 108 adds, deletes, or updates the data stored in the tables 110 and, in addition, notifies the readers 112A-C that there is new data in the tables 110 to be read. The reader 112A-C receives the notification, determines which data has been modified from the notification, and reads this data from the tables 110. In addition, the reader 112A-C updates the corresponding agent 118A-C with the modified data. In one embodiment, the writer 108 notifies the reader using a notification queue. In one embodiment, the writer 108 stores the notification at the head of the notification queue for a particular piece of data (e.g., a routing table entry) and invalidates previous notifications in this queue for this particular piece of data.

Figure 2:
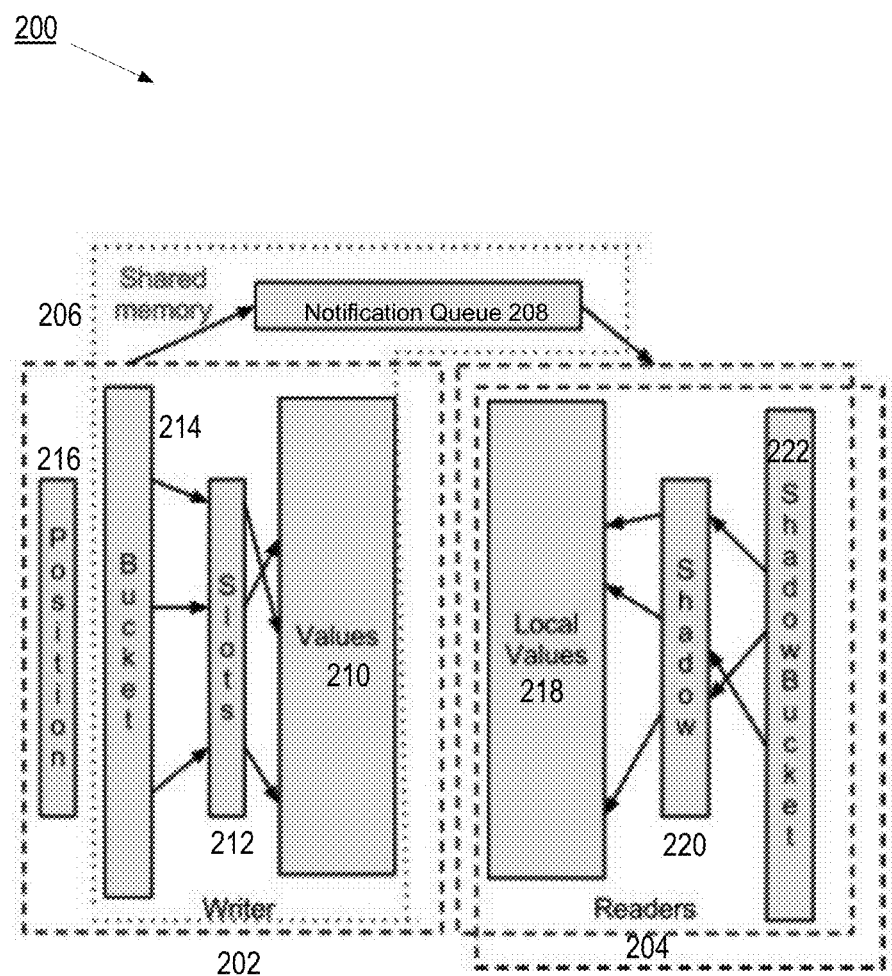
FIG. 2 is a block diagram of one embodiment of a shared memory hash table with notifications to one or more readers.

FIG. 2 is a block diagram of one embodiment of a shared memory hash table system 200 with notifications to one or more readers. In FIG. 2, the shared memory hash table system includes a writer 202, one or more readers 204, and the shared memory hash table 206. In one embodiment, the writer 202 writes values to the shared memory hash table 206 using a wait-free write, where each of the values is a (key, value) pair. The shared memory hash table 206 is a data structure used to implement an associative array of entries, which is a structure that can map the data keys to the data values. A hash table uses a hash function to compute an index into an array of entries, from which the correct value can be stored or retrieved. The shared memory hash table is further described in FIGS. 3-7 below. In one embodiment, the readers 204 each read the values stored in the shared memory hash table 206.

In one embodiment, the shared memory hash table 206 includes bucket table 214, slot table 212, and value table 210. In one embodiment, the bucket table 214 serves as the hash function range: the hashing function will hash a key into a position in the bucket table 214. The bucket table entry contains a versioned offset, linking the bucket to a chain in the slot table 212. The bucket table is further described in FIG. 3 below. In one embodiment, the slot table 212 is an array of slot entries, each entry containing a versioned offset to the key/value data in shared memory, plus a versioned link. The versioned link is used for building hash chains on occupied entries, and for free list management on unoccupied entries. The slot table 212 is further described in FIG. 4 below. In one embodiment, the value table 210 is the region where the value data is stored in shared memory. Each of the versioned offsets in the Slot table reference an entry in the values table 210. In one embodiment, a writer 202 further includes a positions table 216, which is used to locate a slot's position in the notification queue 208. In this embodiment, the positions table 216 is a slot identifier to position table that is maintained privately by the writer to provide a direct lookup of the slot identifier to notification queue mapping. While in this embodiment, the slot table 212 and value table 210 are illustrated as separate tables, in alternative embodiments, the slot table 212 and the value table 210 may be combined into a single "SlotValue" table. In this embodiment, the slot and value are stored in a single table and a lookaside buffer is used to modify the contents of the SlotValue table without allowing readers to see intermediate states of a partially-written value. For example and in one embodiment, the lookaside buffer can be a lookaside buffer as described in U.S. patent application Ser. No. 14/270,122, entitled "System and Method for Reading and Writing Data with a Shared Memory Hash Table", filed on May 5, 2014. The benefit of this embodiment is a reduction in code complexity, cache footprint, and a consummate improvement in runtime speed as there are fewer pointers to maintain, less code to execute, and better cache locality.

In one embodiment, the reader(s) 204 read the data stored in the values table 210 and uses this data to update the corresponding agent. Each reader 204 includes local values table 218, shadow table 220, and shadow bucket table 222. In one embodiment, the local values table 218, shadow table 220, and shadow bucket table 222 are snapshots of the value table 210, slot table 212, and bucket table 214, respectively. In one embodiment, a snapshot table is a snapshot of the shared memory table. In this embodiment, whereas a reader may need to take care when accessing a shared memory table, the snapshot does not change until the reader specifically copies data from the shared memory table into the "snapshot" table.

In this embodiment, the snapshot tables allow software (e.g., the readers) that is unaware or unable to deal with the constraints of shared memory tables to run unmodified within the reading agent or process. For example and in one embodiment, an unsophisticated bit of software may expect that if it reads key K and retrieves value V that if it reads K again immediately it will get value V again. Due to the concurrent operation of the shared memory hash table, repeated reading of this key may not guarantee a retrieval of the same value. In one embodiment, handling with this concurrent operation can require changes to the reader software if, for instance, it was originally written without the shared memory approach in mind. For example and in one embodiment, one approach to sending notifications for a hash table between processes is to send a stream of key-to-value updates (insertion, deletion, or changes) over a network socket. In this embodiment, the local copy within the reader's address space does not changes except when the reader intentionally de-queues updates from the socket. In another embodiment, the hash table in shared memory can change asynchronously, requiring either changes in the reader software or some code to produce a snapshot version of the table that does not change asynchronously.

In one embodiment, the local values table 218 is the region where the sanitized version of the value data are stored in shared memory. In one embodiment, the shadow table 220 is a reader-local "shadow" of the shared memory slot table 212. It represents the reader's sanitized copy of the constantly changing slot table 212 state, as updated exclusively by the received slot identifier ("slot-id") notifications. In one embodiment, the shadow table 220 is sized with the same number of N entries, and has matching slot-id indexes. The shadow table 220 is further described in FIG. 5 below. In one embodiment, the shadow bucket table 222 is similar to the bucket table 214 and the shadow bucket table 222 provides a hash index into the shadow slot table 220, so that the reader(s) 204 can perform lookups on their local sanitized state. The shadow bucket table 222 is further described in FIG. 6 below.

In one embodiment, to notify each reader 204 of the changes to the values stored in the values table, the writer 202 stores notifications in the notification queue 208. In one embodiment, the notification queue 208 is a single shared notification queue for any number of readers, and writers are unaware of any reader state. The notification queue 208 is further described in FIG. 7 below.

Figure 3:
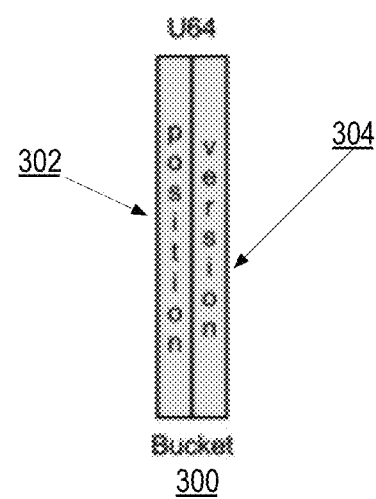
FIG. 3 is a block diagram of one embodiment of a bucket for the shared memory hash table.

As described above, the shared memory hash table includes a bucket table. FIG. 3 is a block diagram of one embodiment of a bucket table 300 of the shared memory hash table. The bucket table 300 serves as the hash function range: the hashing function will hash a key into a position in the bucket table 300. The bucket table entry contains a versioned offset, linking the bucket to a chain in the slot table. In one embodiment, versioned offsets are used in the shared memory hash table data structures. The versioned offsets allow for a lock-free mechanism for writers and readers to safely access shared state. An illustrated discussion on how versioned offsets works is described further in FIGS. 12 and 13. In one embodiment, a versioned offset is a 32-bit offset (or index, or pointer) and 32-bit version. In one embodiment, the versioned offset is written atomically using a single 64-bit load or store instruction, and the versioned offset is read atomically using a single 64-bit load instruction. In one embodiment, the versioned offset looks like this:

```
typedef struct {
    uint32_t slotIndex•
    uint32_t version•
} BucketEntry•
```

Figure 4:
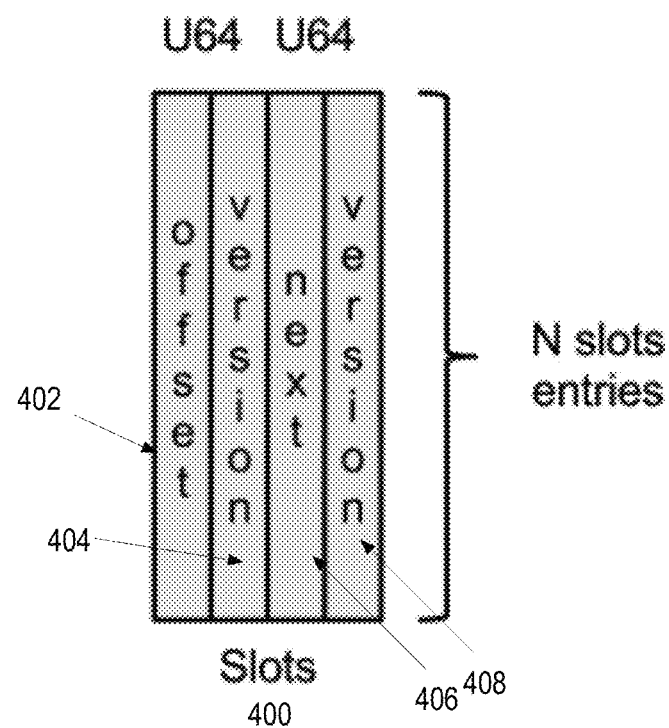
FIG. 4 is a block diagram of one embodiment of a slot for the shared memory hash table.

Each of the bucket entries can reference a slot entry in a slot table. FIG. 4 is a block diagram of one embodiment of a slot table 400 for the shared memory hash table. In FIG. 4, the slot table 400 is an array of slot entries, where each entry containing a versioned offset to the key/value data in shared memory, plus a versioned link. The versioned link is used for building hash chains on occupied entries, and for free list management on unoccupied entries.

```
typedef struct {
    uint32_t valueOffset•
    uint32_t valueVersion•
    uint32_t next•
    uint32_t nextVersion•
}
```

Initially, the slot table 400 has the entries linked onto a writer-owned freelist. When a new key/value is inserted into the table, a slot entry is allocated from the freelist, and the index of the entry being the slot identifier. This automatic allocation and mapping of slot identifiers, used in the notification mechanism, is a feature of this coalesced hashing algorithm. If the newly inserted key/value has collided with an existing slot linked to the bucket, the new allocation is linked to the existing chain in key order. Ordering the chains by key helps preserve important iteration properties (such as no duplicates) and allow for faster key lookup. The number of entries in the table is sized to be the same the maximum supported table entries, which are N elements. The slot table total size can therefore be calculated as:

$$\text{slot table size} = N * 2 * \text{sizeOf}(\text{uint64\_t})$$

In one embodiment, uint32_t and uint64_t are standard POSIX type declarations used to represent 32-bit and 64-bit unsigned integers, respectively.

In one embodiment, the values table is the region where the value data are stored in shared memory. In this embodiment, the versioned offsets in the slot table references the values stored in the values table. In one embodiment, the value types are statically sized, and thus, the values table is a single table with N+1 entries. In addition, each entry has a link for a freelist, making entry allocation and deallocation easy. In another embodiment, a dynamically sized value types are used and a dynamic memory allocator is used. In this embodiment, the allocator need not worry about concurrency issues as the readers are not aware of allocator metadata.

Figure 5:
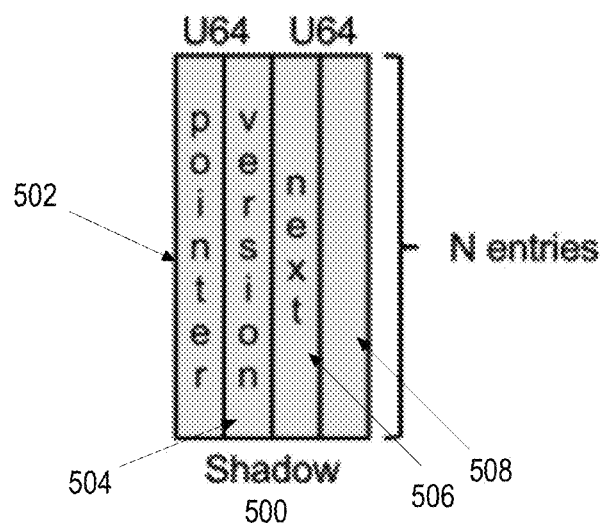
FIG. 5 is a block diagram of one embodiment of a shadow for the shared memory hash table.

FIG. 5 is a block diagram of one embodiment of a shadow table 500 for the shared memory hash table. In FIG. 5, the shadow table 500 is a reader-local "shadow" of the shared memory Slot table. It represents the reader's sanitized copy of the constantly changing Slot table state, as updated exclusively by the received slot-id notifications. In one embodiment, the shadow table is sized with the same number of N entries, and has matching slot-id indexes.

When a slot-id notification for slot S is first processed by the reader, the reader compares its shadow slot key in slot S with the slot key in shared memory in slot S:

If the values of the two keys are the same, or if the shadow table entry for slot S is empty, then the key A can be delivered to the agent as an update.

If the keys are different, say if key B occupies the shadow slot, the reader knows key B is being deleted and key A is being created. So both keys B and A are delivered to the agent as updates (separately, of course).

In either case, prior to delivering any updates to the agent, the shadow table is updated to the current state: that is, key A now occupies the shadow slot. The following pseudocode illustrates this algorithm:

```
// retrieve next slot notification
uint32_t slot = conquer.getSlot( )•
VALUE value•
uint32_t version•
// performs a lockfree
retrieval of key/value at a given slot
do {
    version = slots[ slot ].version•
    value = slots[ slot ].getValue( )•
} while ( version != slots[ slot ].version )•
    // retrieve old shadow table key
    KEY shadowKey = shadow[ slot ].getKey( )•
    // is entry deleted?
    if ( value.isEmpty( ) ) {
    // yes, also delete from shadow index
    deleteShadowEntry( shadowKey )•
    // tell Agent about possibly deleted key
    deliverAgentUpdateFor( shadowKey )•
} else {
    // is the old shadow key and new key different?
    if ( shadowKey != value.getKey( ) ) {
    // delete old shadow key from table
    deleteShadowEntry( shadowKey )•
    // yes, deliver old (possibly deleted) key update to
    the Agent
    deliverAgentUpdateFor( shadowKey )•
}
// insert new key into shadow at given slot
insertShadowEntry( value.getKey( ), slot )•
// tell Agent about changed key/value
deliverAgentUpdateFor( value )•
}
```

If, as part of the update notification, the agent wishes to lookup keys A, B, or any other key in the table, the infrastructure restricts lookups to be local, and not to the shared memory hash table. If the shadow lookup succeeds, then a subsequent lookup into the shared memory hash table can proceed to retrieve the most up-to-date Value. Otherwise the reader risks the "lost delete" race condition. This is one of the reasons why the shadow table maintains a snapshot copy of the keys. For example and in one embodiment, a reader compares the shadow slot with the writer slot and copies the writer copy if different. In this embodiment, readers do local lookups into the shadow table to avoid the 'lost delete' race condition.

Since the shadow table is local to the reader and is accessed by that reader, this shadow table does not need to use versioned offsets. Instead, the shadow table can use local 32-bit pointers to the local key buffer.

Figure 6:
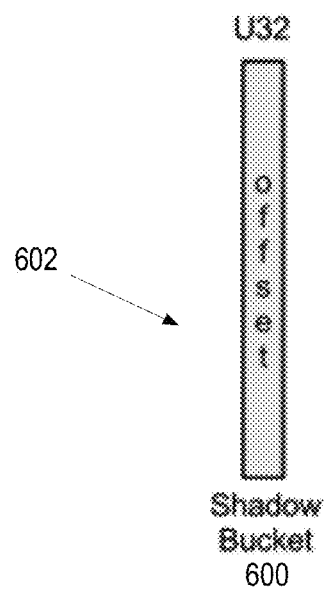
FIG. 6 is a block diagram of one embodiment of a shadow bucket for the shared memory hash table.

In one embodiment, and in addition to the shadow table, each reader includes a shadow bucket table. FIG. 6 is a block diagram of one embodiment of a shadow bucket table 600 for the shared memory hash table. In FIG. 6, shadow bucket table 600 provides a hash index into the shadow slot table so that readers can perform lookups on their local sanitized state. The hash function indexes into this table, allowing the lookup to follow the chain. In one embodiment, the shadow table size for each reader can be calculated as:

shadow bucket table size=$K*N*sizeOf(uint32\_t)$

In one embodiment, this table is private to the reader and it does not reside in shared memory. In this embodiment, because each shadow table 600 corresponds to one reader, the shadow entries do not need a versioned offset.

Figure 7:
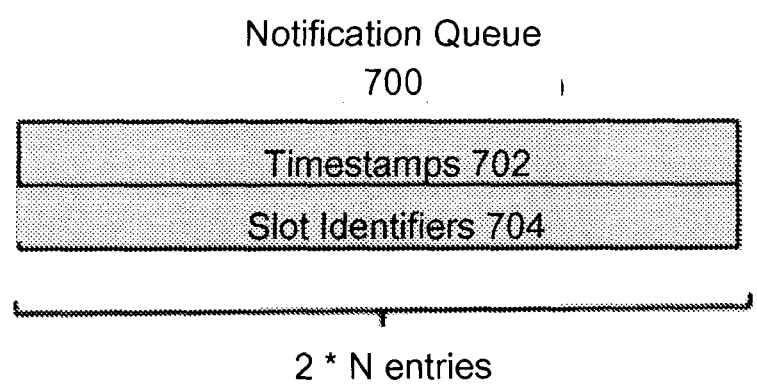
FIG. 7 is a block diagram of one embodiment of a notification queue for the shared memory hash table.

FIG. 7 is a block diagram of one embodiment of a notification queue 700 for the shared memory hash table. In FIG. 7, the notification queue 700 is a single shared notification queue for any number of readers, with writers being unaware of any reader state. In one embodiment, a writer publishes slot changes to the notification queue. In one embodiment, each entry in the queue is a uint32_t slot-id plus a uint64_t timestamp. The timestamp is a virtual timer that increments each time the writer inserts something in the queue. On every slot identifiers insertion to the notification queue, the writer invalidates the old entries occupied by the same slot. This is part of the coalescing mechanism: old, prior entries are wiped out, while new recent entries are in the front. To locate a slot's position in the queue, a slot identifier to position table is maintained privately by the writer to provide direct lookup. In one embodiment, the notification queue 700 can fill up with invalidated entries and slot identifiers, at which time the writer initiates a compression phase to sweep out the invalidated entries.

To notify sleeping readers that a new slot is available for consumption, the writer employs an out-of-band "reader-kick" mechanism. A single byte is sent over a Unix domain socket, giving the reader a hint that notification data is available.

In one embodiment, a notification queue of size N+1 is the theoretical minimum (N occupied slots plus one invalid entry). However, in this embodiment, on a full table of N slots, this will leave room for only one write before compression is needed. In another embodiment, and for better performance, the notification queue 700 is be sized to 2*N entries, making the table to be full every N notifications on average. In a further embodiment, the notification queue can be a different size. For example and in one embodiment, any size that is a constant multiple of N can be used and will still result in a constant time per-write cost for the compression, when amortized over all writes.

In one embodiment, the notification queue can be compressed when the end of the queue is reached by removing the invalidated entries. In this embodiment, an alternate notification queue buffer of the same size as the active notification queue is maintained. The alternate notification queue allows the writer to sweep the queue, copy over the active slot identifier entries, while readers continue to concurrently process entries. When the writer finishes compressing to the alternate buffer, the writer flips a master versioned pointer and the alternate becomes the active. Readers that are concurrently looking at the notification queue 700 should validate that the master notification queue pointer has not changed before and after reading from the queue.

If a reader discovers that the notification queue is compressed while a slot/timestamp was being read, the reader repositions itself. In one embodiment, the reader repositions itself by doing a binary search on the queue timestamps to find the new position. The reader finds its position in the newly-compressed queue by searching for the first timestamp that is larger than the timestamp of the entry that it last processed. Once the new position is found, the reader can continue consuming slot notifications.

Figure 8A:
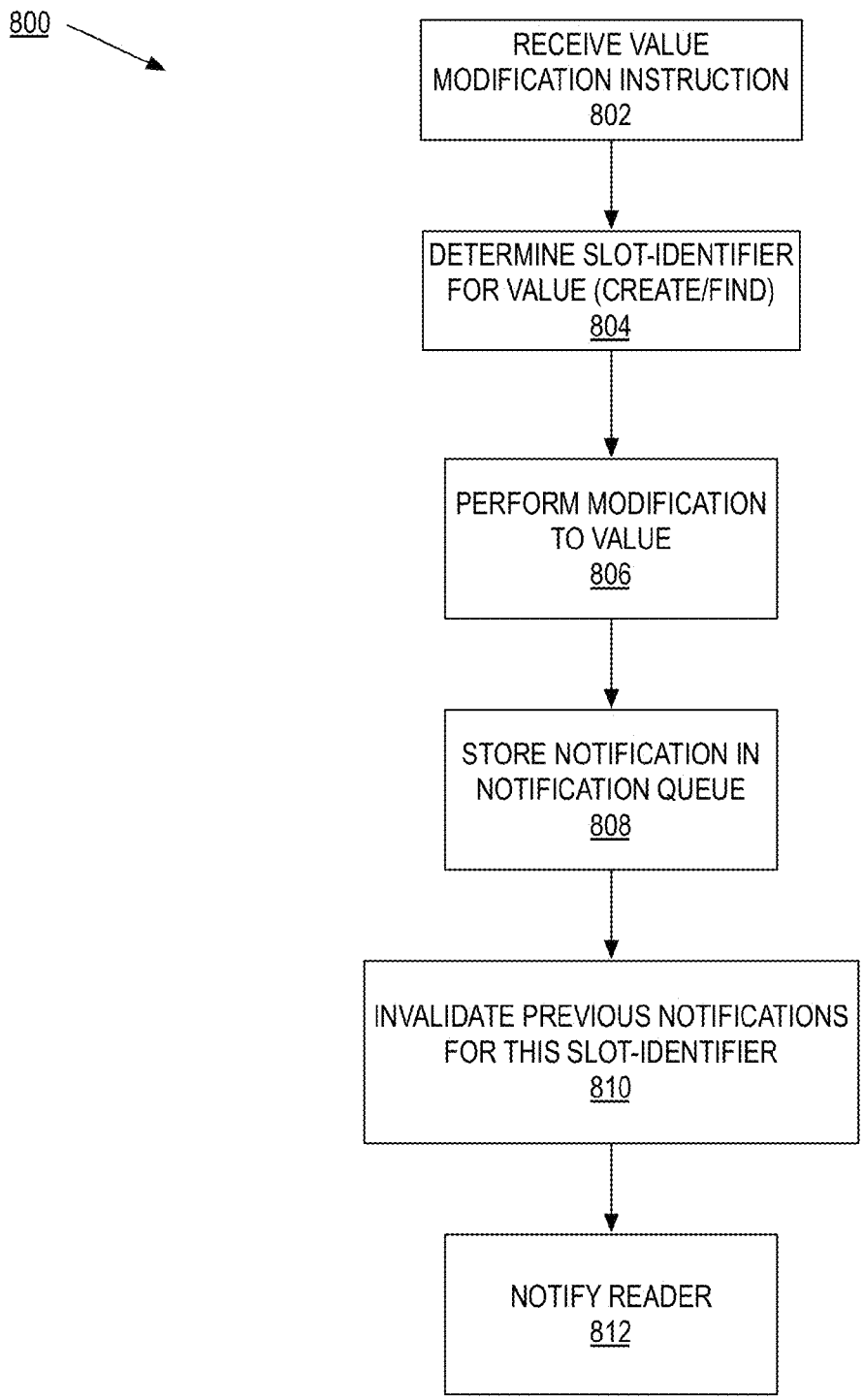
FIG. 8A is a flow diagram of one embodiment of a process to notify a reader that a value has been modified in the shared memory hash table.

With the above structure, a writer can signal the one or more readers that one of the values for a key has been modified. FIG. 8A is a flow diagram of one embodiment of a process 800 to signal a reader that a value has been modified in the shared memory hash table. In one embodiment, a writer performs process 800 to signal a reader that one of the values for a key has been modified, such as the writer 202 as described in FIG. 2 above. In one embodiment, FIG. 8A illustrates an overall modification process of a value. Specific examples of adding a key, modifying a key, and deleting a key are further described in FIGS. 9A, 10A, and 11A below. In FIG. 8A, process 800 begins by receiving a value table modifying instruction at block 802. In one embodiment, a value table instruction modifying can be an insertion of a new (key, value) pair into the value table, a change to a value of a (key, value) pair, or a deletion of a (key, value) pair. At block 802, process 800 determines a slot identifier for the value instruction. In one embodiment, the slot identifier identifies a slot in the slot table that corresponds to a key of the affected the (key, value) pair. If there is not a slot corresponding to the key in the instruction, a new slot is created. For example and in one embodiment, process 800 allocates a new slot for the instruction. Process 800 performs that modification to the value at block 806. In one embodiment, the modification can be adding a new (key, value) pair to the value table, changing a value of a (key, value) pair, or delete a (key, value) pair.

Process 800 invalidates previous notifications for the slot identifier in the notification queue at block 808. In one embodiment, by invalidating the previous notifications in the notification queue for this slot identifier allows a reader to process the most recent notification for that slot, as each reader maintains a sanitized copy of the values in the value table. In one embodiment, a sanitized copy is a copy that includes some or all of the up-to-date values that are stored in the values table. At block 810, process 800 stores a notification in a notification queue that a slot in the slot table has a value that has been modified. In one embodiment, the notification queue is used to hold notifications for readers that indicate values in the value table have been modified. Process 800 signals the reader that there is a new notification available for the read to process at block 812. In one embodiment, by signaling the reader, the reader can retrieve this notification, update the local copy of the data, and notify that corresponding agent(s). In one embodiment, process 800 signals the reader by sending a single byte over a Unix domain socket, giving the reader an indication that a notification is available.

Figure 8B:
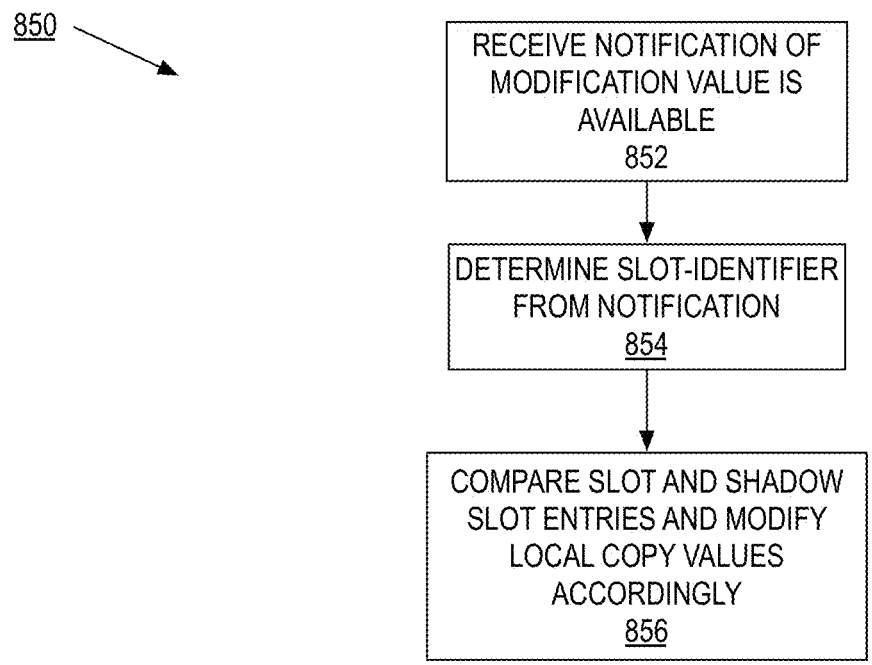
FIG. 8B is a flow diagram of one embodiment of a process to process a notification that a value has been modified in the shared memory hash table.

FIG. 8B is a flow diagram of one embodiment of a process 850 to process a signal that a value has been modified in the shared memory hash table. In one embodiment, a reader performs process 850 to process a signal that one of the values for a key has been modified, such as the reader 204 as described in FIG. 2 above. In one embodiment, FIG. 8B illustrates an overall signaling process. Specific examples of adding a key, modifying a key, and deleting a key are further described in FIGS. 9B, 10B, and 11B below. In FIG. 8B, process 850 begins by receiving the signal that there are one or more notifications for process 850 to process at block 852.

In one embodiment, the signal is a single byte received over a Unix domain socket. In one embodiment, there are multiple notifications that process 850 can process. At block 852, process 850 determines a slot-identifier for the each of notifications. In one embodiment, process 850 reads the next available slot identifier from the notification queue, skipping over any invalidated entries. Using the retrieved slot identifier, process 850 compares the slot and shadow slot entries and modifies the local copy value accordingly at block 854. In one embodiment, process 850 compares the existence and/or content of the value associated with the key corresponding to the slot identifier with the corresponding value in the shadow table and determines whether to update the locally stored key, add the key, or delete the key. Comparing the slot and shadow slot entries is further described in FIGS. 9B, 10B, and 11B below.

In one embodiment, the performance of the writer is $O(1)$ per write. In this embodiment, a writer update to the shared memory hash table costs an $O(1)$ table lookup, plus an $O(1)$ update to the notification queue. If the notification queue is full, a compaction occurs, where the writer reads each queue entry and copies the live entries to the alternate queue. In one embodiment, the compaction of the notification queue is an $O(n)$ traversal, which happens if all notification queue entries are used up, and so this operation adds up to only three operations per entry for the life of the queue. Thus, the performance of the writer is $O(1)$ per write. In one embodiment, the compaction of the notification queue occurs without disruption of read access for a reader. In this embodiment, a reader can still have access to the notification entries while the compaction of the notification queue occurs.

In another embodiment, each reader update is also $O(1)$ per notification. In this embodiment, reading the next slot identifier from the notification queue and comparing the slot with the shadow slot by the reader is $O(1)$. Updating the shadow value table, if necessary, is $O(1)$. If the notification queue undergoes compaction, the reader performs a binary search of the queue, repositioning itself at the correct timestamp. This search is $O(\log N)$, but the binary search happens when the writer has performed compaction. Thus, each reader update is $O(1)$ per notification.

As described above, both the writes and the reads are basically $O(1)$. In one embodiment, the shared memory hash table does have one special property that should be noted. Writes generate traffic in the notification queue. Whether the writer writes to the same key or different keys, the notification queue will be undergoing fill/compress cycles, regardless of what the readers are doing. For a reader, the slower the reader is at processing updates, the more invalid entry skipping and $O(\log N)$ repositioning they will do. In one embodiment, one or more optimizations can help reduce this churn, such as invalid entry skipping and duplicate writes. These optimizations are described below.

In one embodiment, a number of optimization can be made to the shared memory hash table. In one embodiment, a writer that modifies the same slot over and over again will generate an ongoing stream of same-slot invalid entries. This churn can easily be eliminated by the writer first looking at the notification queue head, and if the notification is for the same slot, simply increment the existing timestamp (and kicking the readers if necessary). Thus, in this embodiment, consecutive duplicate writes will only result in timestamp increments and no additional invalid entries.

In another embodiment, it would be useful to have the ability to skip invalid entries when the reader is trying to find the next valid slot notification, or for the writer to build the new list at compression time. In this embodiment, this can be achieved by forming a doubly-linked list structure of valid slots in the notification queue. Each slot in the notification queue is a pair of <timestamp, slot identifier> (padded to 64-bit alignment), but there is enough space to add a next position to give a hint as to where is the next valid slot in the queue <timestamp, slot identifier, next position>. In this embodiment, the previous positions in the double-linked list are used by the writer to update the next positions and these can be stored in alternative notification queue buffer (as described in paragraph 61 above) without any versioning.

In a further embodiment, the writer maintains a position array to directly index a slot identifier to notification queue position. When a writer modifies a slot table entry at position S, the writer uses the position array to index into the notification queue at the most recent position of slot S so that it can be invalidated. In one embodiment, this position array need not be visible to readers as this is part of the writer's private state. However, in another embodiment, this position index can be part of the slot table entry. Every time the writer looks up a slot, it will also likely need the position index as well. Keeping these values in the same structure can improve cache locality.

Figure 9A:
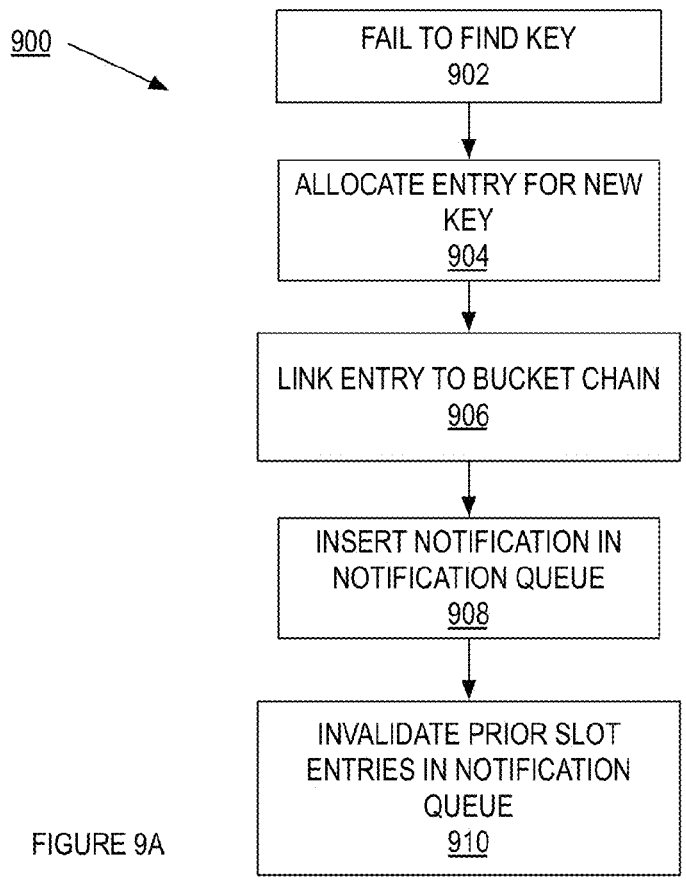
FIG. 9A is a flow diagram of one embodiment of a process to notify a reader that a value has been added in the shared memory hash table.

FIG. 9A is a flow diagram of one embodiment of a process 900 to notify a reader that a value has been added in the shared memory hash table. In FIG. 9A, process 900 begins by failing to find a key in the bucket table at block 902. In one embodiment, process 900 looks up in the bucket table for the newly added key and process 900 fails to find this key. At block 904, process 900 allocates a free entry from the values table for the new key. In one embodiment, process 900 further allocates a free slot from the slot table's free-list. In addition, process 900 copies the data into the newly allocated value entry. In addition, process 900 sets the slot versioned pointer in the newly allocated slot entry from block 902 to reference the newly allocated value entry. Process 900 links the slot entry to the bucket chain. In one embodiment, process 900 links this slot entry to the bucket chain in the key order. By linking the slot entry to the corresponding bucket chain, process 900 makes the newly allocated value entry available to the one or more readers. Process 900 invalidates prior slot entries with the same slot identifier in the notification queue at block 908. In one embodiment, process 900 invalidates these entries so that a reader retrieves the latest notification and does not retrieve older, unprocessed notifications. In this embodiment, the older unprocessed notification(s) are not needed as the reader uses the latest notification for the slot to maintain the sanitized copy of the reader. At block 910, process 900 inserts a notification into the notification queue. In one embodiment, this notification indicates that the slot allocated at block 904 is updated. In this embodiment, a reader reading this notification would extract the slot identifier from the notification and process this notification. Processing the notification for a key addition is further described in FIG. 9B below.

Figure 9B:
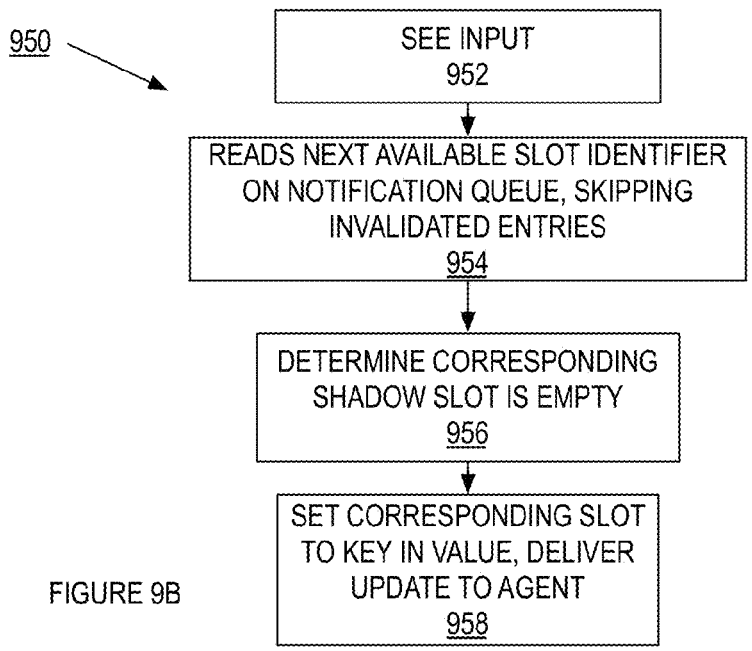
FIG. 9B is a flow diagram of one embodiment of a process to process a notification that a value has been added in the shared memory hash table.

FIG. 9B is a flow diagram of one embodiment of a process 950 to process a notification that a value has been added in the shared memory hash table. In FIG. 9B, process 950 begins by seeing input on the reader's file descriptor at block 952. In one embodiment, process 950 includes an activity manager with a select/poll. In this embodiment, the select/poll sees input on the reader-kick file descriptor, which invokes a file descriptor handler. In one embodiment, seeing input on the reader's file descriptor indicates that there is one or more notifications in the notification queue that are available to process. At block 954, process 950 reads the next available slot identifier for each available notification from the notification queue. In this embodiment, process 950 further skips over any invalidated entries in the notification queue. Process 950 reads the key associated with the slot identifier and compares this key with the key identified by the same slot identifier in the shadow slot table. If there is not a key identified in the shadow slot table, process 950 determines that the corresponding shadow slot is empty at block 956. At block 958, process 950 sets the corresponding slot to this key. Furthermore, process 950 delivers an updated value for this key to an agent. For example, if this key is a new route for the routing table, process 950 delivers this updated route to the agent that handles routing table updates.

Figure 10A:
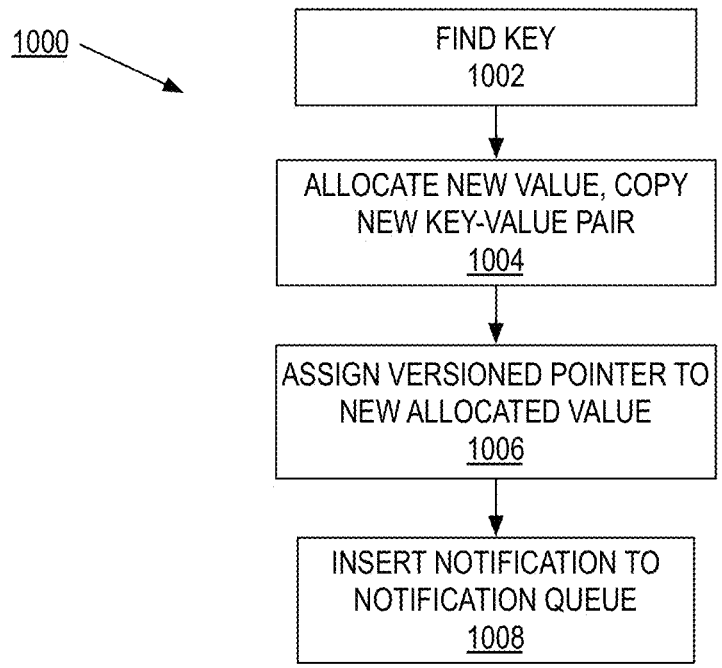
FIG. 10A is a flow diagram of one embodiment of a process to notify a reader that a value has been changed in the shared memory hash table.

FIG. 10A is a flow diagram of one embodiment of a process to notify a reader that a value has been changed in the shared memory hash table. In FIG. 10A, process 1000 finds a key corresponding to a changed value at block 1002. In one embodiment, process 1000 performs a key lookup in the bucket table and finds this key. At block 1004, process allocates a new value table entry and copies the (key, value) pair is copied into the newly allocated value table entry. Process 1000 assigns the versioned pointer to the value table entry and the old value table entry for the key is freed at block 1006. Assigning the version pointer is further described in FIG. 13 below. At block 1008, process 1000 inserts a notification into the notification queue and invalidates older entries. In one embodiment, this notification indicates that the slot identified at block 1002 is updated. In this embodiment, a reader reading this notification would extract the slot identifier from the notification, determine the corresponding key, and process this notification. Processing the notification for a key change is further described in FIG. 10B below. In addition, process 1000 invalidates the prior slot entry that has the same slot identifier in the notification queue. In one embodiment, process 1000 invalidates this entry so that a reader retrieves the latest notification and does not retrieve older, unprocessed notifications. In this embodiment, the older unprocessed notification(s) are not needed as the reader uses the latest notification for the slot to maintain the sanitized copy of the reader.

Figure 10B:
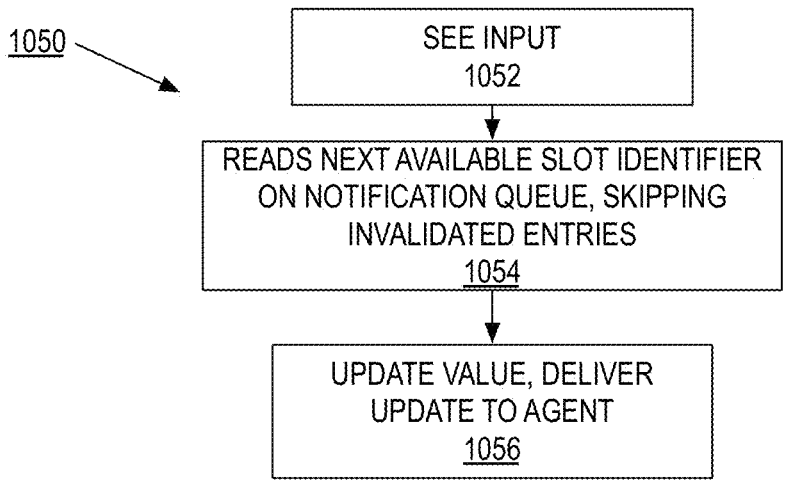
FIG. 10B is a flow diagram of one embodiment of a process to process a notification that a value has been changed in the shared memory hash table.

FIG. 10B is a flow diagram of one embodiment of a process 1050 to process a notification that a value has been changed in the shared memory hash table. In FIG. 10B, process 1050 begins by seeing input on the reader's file descriptor at block 1052. In one embodiment, process 1050 includes an event loop or thread that uses, for example a select, poll, epoll, kqueue, read, or other operation to detect input on the reader's file descriptor at block 1052. In this embodiment, the reader event loop or thread sees input on the reader-kick file descriptor. In one embodiment, seeing input on the reader's file descriptor indicates that there is a notification in the notification queue available to process. At block 1054, process 1050 reads the next available slot identifier from the notification queue. In this embodiment, process 1050 further skips over any invalidated entries in the notification queue. Process 1050 reads the key associated with the slot identifier and compares this key with the key identified by the same slot identifier in the shadow slot table. If the same key is identified in the shadow slot table, process 1050 updates the value. At block 1056, process 1050 updates the corresponding slot in the shadow slot to the value for this key. Furthermore, process 1050 delivers an updated value for this key to an agent. For example, if this key is an updated route for the routing table, process 1050 delivers this updated route to the agent that handles routing table updates.

Figure 11A:
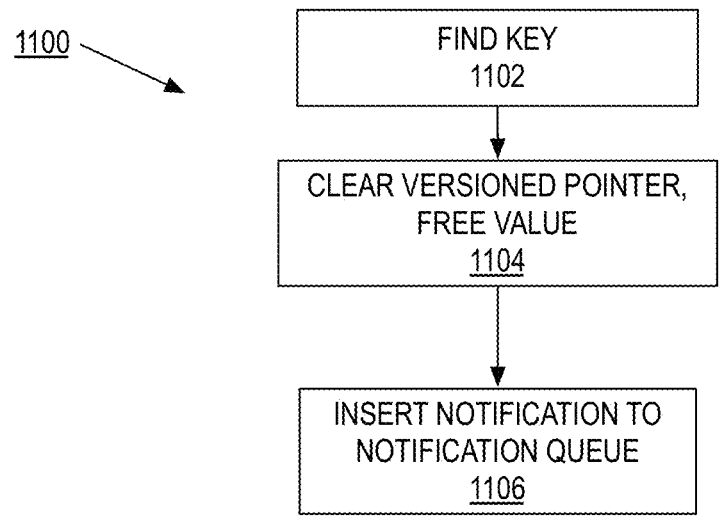
FIG. 11A is a flow diagram of one embodiment of a process to notify a reader that a value has been deleted in the shared memory hash table.

FIG. 11A is a flow diagram of one embodiment of a process 1100 to notify a reader that a value has been deleted in the shared memory hash table. In FIG. 11A, process 1100 finds a key corresponding to a deleted value at block 1102. In one embodiment, process 1100 performs a key lookup in the bucket table and finds this key. At block 1104, process 1100 clears the versioned pointer and frees the value table entry that corresponds to the key. In one embodiment, process 1100 clears the versioned pointer by zeroing the offset and incrementing the version. At block 1106, process 1100 inserts a notification into the notification queue and invalidates older entries. In one embodiment, this notification indicates that the slot identified at block 1102 is updated. In this embodiment, a reader reading this notification would extract the slot identifier from the notification and process this notification. Processing the notification for a key deletion is further described in FIG. 11B below. In addition, process 1100 invalidates the prior slot entry with the same slot identifier in the notification queue. In one embodiment, process 1100 invalidates these entries so that a reader retrieves the latest notification and does not retrieve older, unprocessed notifications. In this embodiment, the older unprocessed notification(s) are not needed as the reader uses the latest notification for the slot to maintain the sanitized copy of the reader.

Figure 11B:
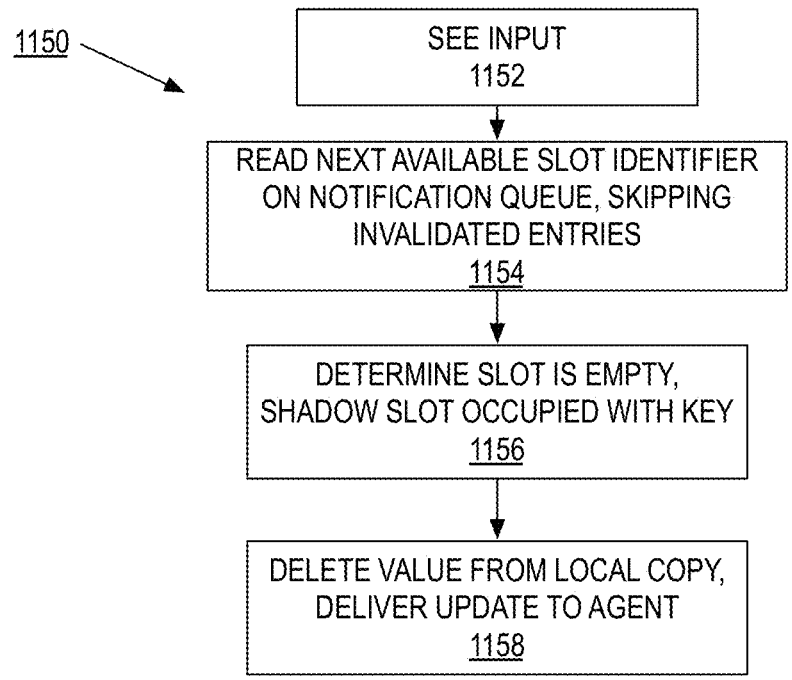
FIG. 11B is a flow diagram of one embodiment of a process to process a notification that a value has been deleted in the shared memory hash table.

FIG. 11B is a flow diagram of one embodiment of a process 1150 to process a notification that a value has been deleted in the shared memory hash table. In FIG. 11B, process 1150 begins by seeing input on the reader's file descriptor at block 1152. In one embodiment, process 1150 includes an event loop or thread using select, poll, epoll, kqueue, read, or other operation. In this embodiment, the event loop or thread sees input on the reader-kick file descriptor. In one embodiment, seeing input on the reader's file descriptor indicates that there is a notification in the notification queue available to process. At block 1154, process 1150 reads the next available slot identifier from the notification queue. In this embodiment, process 1150 further skips over any invalidated entries in the notification queue. Process 1150 reads the key associated with the slot identifier and compares this key with the key identified by the same slot identifier in the shadow slot table. Process 1150 determines that the slot is empty in the slot table and that the corresponding slot entry in the shadow slot table contains the key. At block 1158, process 1150 deletes the corresponding slot entry in the shadow slot table. Furthermore, process 1150 delivers an updated value for this key to an agent. For example, if this key is a route for the routing table, process 1150 delivers this updated route to the agent that handles routing table updates.

In one embodiment, and as described above, a reader kick is a synchronization trigger delivered from the writer to the reader. In one embodiment, the reader kick is a way to tell the reader there is work to do on the notification queue. After a reader has processed the entries in the notification queue, the reader returns control back to the event loop. In one embodiment, the agent sleeps until woken by activity on a file descriptor. In another embodiment, and in absence of a way to kick a reader awake to make it check the notification queue, one could use a timeout. In one embodiment, there are two parts to the problem: how to kick the reader and when to kick the reader. In one embodiment, because of the event loop of the reader, a reader kick uses one of the file descriptor dependent options. For example and in one embodiment, a type of file descriptor that is used is a Linux kernel eventfd, Linux pipe, named pipe or first-in first-out (FIFO), POSIX Message queue, or a Unix Domain Socket. In this embodiment, the eventfd is a kernel primitive for enabling file-descriptor based cross-process synchronization. The eventfd is lightweight and easy to use and requires file-descriptor inheritance through fork/exec or the sendmsg/recvmsg control channel. The Linux pipe is a reliable, unidirectional, streamed pipe. A named pipe or FIFO is a reliable, unidirectional, streamed pipe through the kernel with filesystem naming. A POSIX Message queue is a reliable, unidirectional queue that preserves message boundaries. A Unix domain socket is a reliable, bidirectional, and is either stream or datagram (preserves message boundaries). In one embodiment, that another type of notification mechanism could be used without changing the essential form or substance of the invention.

In one embodiment, the writer and the readers communicate using Unix domain sockets, because having the property of bidirectional communication is useful. In one embodiment, the writer creates a socket in the filesystem, at the same place the shared memory files are located:

/<writer-root>/<tablename>/conquer-kick

In this embodiment, this socket will be registered with the event loop for I/O monitoring. With this socket, any interested reader can connect to this socket to establish their notification kick relationship with the writer. In one embodiment, the Unix domain socket is additionally used as a table ownership lock. In this embodiment, this is a mechanism to arbitrate exclusive "ownership" is useful having one writer and multiple readers. In one embodiment, the Unix domain socket is used via an "abstract namespace" to provide the atomic property that ownership requires. This is opposed to the usual filesystem namespace, which does not have atomic properties.

In one embodiment, kicking the reader may require a form of cross-process synchronization, which can be an expensive operation. In this embodiment, it is useful to kick the reader when necessary to process a notification. In order to minimize the number of reader kicks, a reader timestamp can be used in shared memory or from the socket. In one embodiment, for a reader timestamp in shared memory, when a reader catches up and blocks in select, the reader updates its most recent timestamp from the notification queue in a shared memory location available to the writer. On each notification queue update, the writer compares the reader's shared memory current timestamp with the last time the reader got kicked, and issues a kick if they are different. In another embodiment, for a reader timestamp from socket, it is the same as above, except that the reader timestamp is delivered in a named pipe, FIFO, or Unix domain socket. An interesting difference about this is that the writer gets notified when a reader has blocked (by virtue of receiving data on the socket) the above option does not have this notification.

In one embodiment, an advantage of the shared memory reader timestamp is that the communication between the writer and the reader has low latency and is fast. For example and in one embodiment, the amount of time it takes the writer to look at the reader's timestamp is simply a direct memory access time, with no process scheduling or other kernel interaction. However, this does require a special shared memory area to be set up, thus complicating the procedure a reader uses when attaching to a notification queue. Also, there is no notification on the reader changing this value, so the writer would have to poll all readers, thus making each write O(r), where r is the number of readers. In addition, having a shared memory region for each writer-reader memory pair would create a memory visibility dependency on readers, possibly complicating the cache coherency and memory ordering.

In another embodiment, the socket reader timestamp approach can add latency and extra work because of kernel and scheduling interactions. In addition, if the writer or reader exits, the reader will have to deal with the socket disconnection and reconnection on restart, and vice-versa. However, the socket reader timestamp approach does not require a shared memory segment from the reader to the writer. In addition, this approach provides an automatic notification to the writer when a reader is ready to be kicked. This can avoid repeated redundant kicks. In one embodiment, the writer kicks a reader using the socket reader timestamp approach.

In one embodiment, as described above, a versioned pointer or offset is composed of an offset, combined with a version. In this embodiment, when the offset or the content it points to changes, the version is incremented. The version increment is an indication to concurrent readers that the entry has changed beneath it, and the entry now cannot be trusted. In one embodiment, the reader reads both the version and the object the version protects onto the stack of the reader. Before the reader uses the read object, the reader checks that the version has not yet changed. If the object protected by a version is a pointer or table index, the data pointed to can be copied to the reader's local (non-shared) storage. In this embodiment, before data can be used, the reader validates the versioned pointer to ensure that the data the reader has a copy of was indeed a completely valid snapshot of that data at some point in the past, if not also currently. In one embodiment, the offset and versions are 32-bit data and the writer writes the complete 64-bit quantity atomically. In one embodiment, if the offset and version are written out of lockstep, there is window of opportunity that an inconsistency can result.

Figure 12:
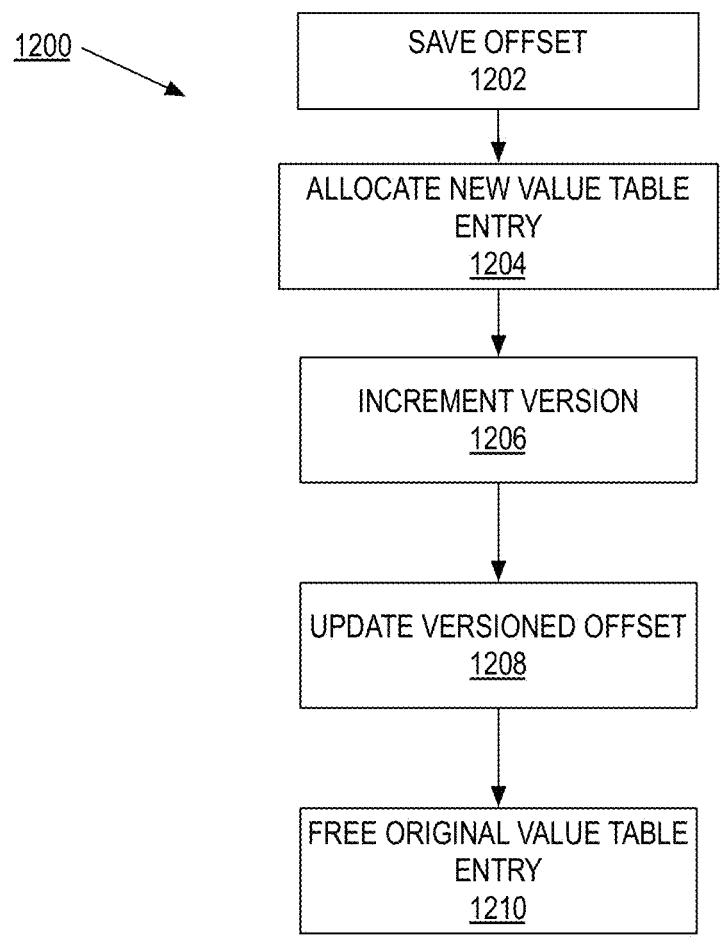
FIG. 12 is a flow diagram of one embodiment of a process to perform a wait-free write of a value.

In one embodiment, a reader can read the entire 64-bit quantity atomically, but is not necessary. Instead, a reader reads the 32 bit version first, then the offset. Once access to the offset contents is complete, the version is read again and compared with its initial version. If different, the read operation is redone to get a consistent result. FIG. 12 is a flow diagram of one embodiment of a process 1200 to perform a wait-free write of a value. In one embodiment, a writer performs process 1200 to perform a wait-free write of a value, such as the writer 202 as described in FIG. 2 above. In FIG. 12, process 1200 begins by saving the original offset of the value table entry for this value at block 1202. In one embodiment, this offset is saved so that this value table entry can be freed after the new value table entry is inserted into the value table. At block 1204, process 1200 allocates a new value table entry for the (key, value) pair. In one embodiment, the new value table entry for the (key, value) pair can be retrieved from a free-list that is maintained for the values tables or can be dynamically allocated. In addition, the new value table entry includes an offset that references the new value table entry. Process 1200 increments the version stored in the slot for this key at block 1206. In one embodiment, an incremented version can indicate to a reader that a previously read value may not be an up to date value. At block 1208, process 1200 updates the slot with the offset for the new value table entry and the incremented version. In one embodiment, process 1200 updates the slot atomically. Process 1200 frees the original value table entry using the saved offset at block 1210.

Figure 13:
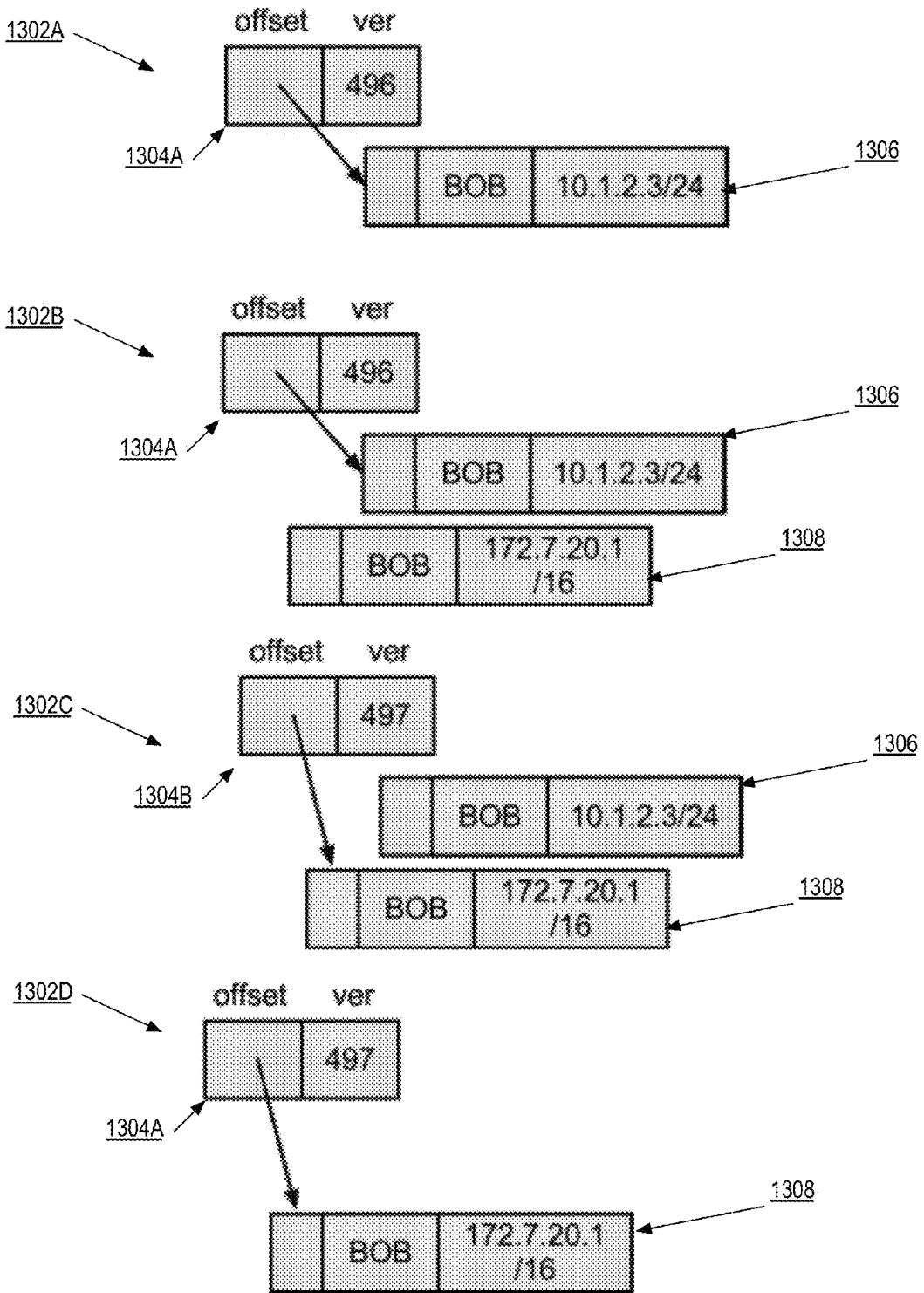
FIG. 13 is an illustration illustrating a wait-free write of a value.

FIG. 13 is an illustration illustrating a wait-free write of a value. In one embodiment, FIG. 13 illustrates the wait-free write of process 1200 as described in FIG. 12 above. In FIG. 13, illustrations 1302A-D illustrate the wait-free write of an update to a value table entry that includes a route "BOB" from a value of 10.1.2.3/24 to 172.7.20.1/16. In illustration 1302A, a versioned offset 1304A references a value table entry 1306 for a route "BOB" that has a value 10.1.2.3/24. A new value table entry 1308 is allocated that is for an updated "BOB" route with the value 172.7.20.1/16 in illustration 1302B. The versioned offset 1304A, at this point, still references the original value table entry 1306. In illustration 1302C, the versioned offset 1304B is updated to reference the new value table entry 1308 and the version is updated from 496 to 497. The original value table entry 1306 is freed in illustration 1302D.

In one embodiment, a writer audits its tables when restarting, which ensures that offsets in the tables are pointing to valid locations. In this embodiment, auditing when restarting is important for a recover from failures in which a failing writer may exit in a way that corrupts the shared memory tables. In addition, the writer rebuilds a list of allocated/freed records, so that bucket chains are valid and notifications have not been lost. In this embodiment, the writer builds a set of allocated and a set of free records from the values table, ensuring that the allocated records are being pointed by the slots table and that there is not a slot is pointing to a freed memory location. In one embodiment, this can be achieved by walking the slots table and following each offset. In another embodiment, the writer can kick all readers when restarting rather than keeping an internal state.

In one embodiment, and in order to make sure that no notifications or kicks to the readers are lost, it could just happen that the writer dies when the writer is about to write a notification or kick a reader. In this embodiment, the writer keeps an internal state in the notification queue to avoid any lost notification. When a writer finishes auditing its tables it will open its Unix domain socket and start accepting connections so that readers can resume consuming notifications.

Figure 14:
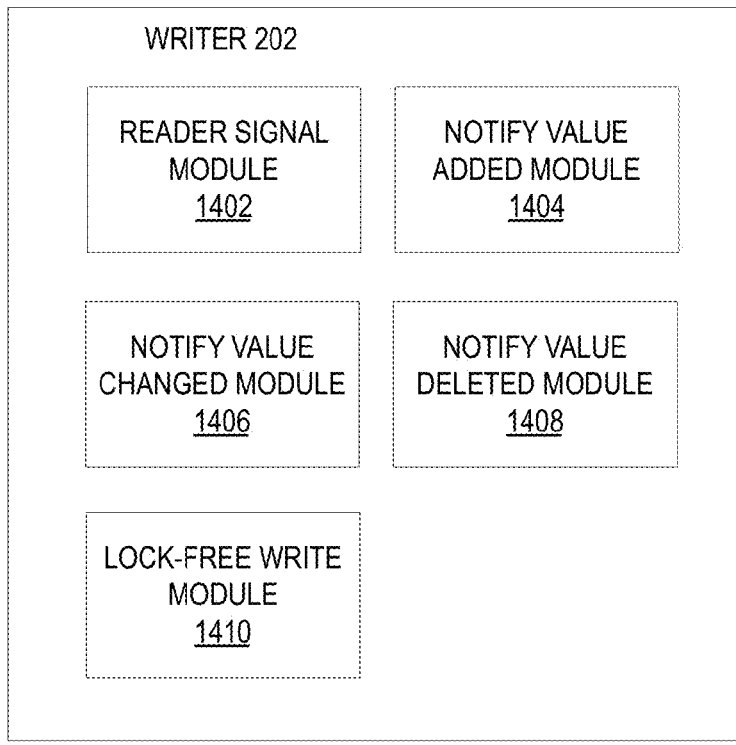
FIG. 14 is a block diagram of a writer.

FIG. 14 is a block diagram of a writer 202. In one embodiment, the writer 202 includes a reader signal module 1402, notify value added module 1404, notify value changed module 1406, notify value deleted module 1408, and wait-free write module 1410. In one embodiment, the reader signal module 1402 signals a reader that a notification is available as described in FIG. 8A above. The notify value added module 1404 notifies that a value has been added as described in FIG. 9A above. The notify value changed module 1406 notifies that a value has changed as described in FIG. 10A above. The notify value deleted module 1408 notifies that a value has been added as described in FIG. 11A above. The wait-free write module 1410 performs a lock free write as described in FIG. 12 above.

Figure 15:
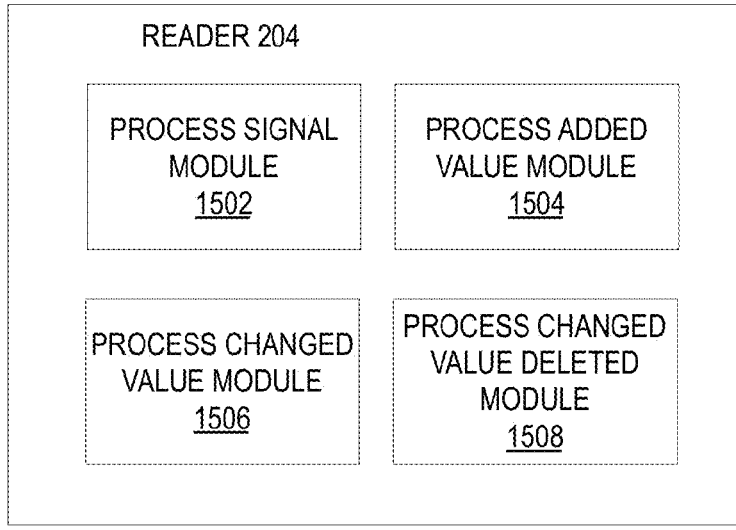
FIG. 15 is a block diagram of a reader.

FIG. 15 is a block diagram of a reader 204. In one embodiment, the reader 204 includes a process signal module 1502, process added value module 1504, process changed value module 1506, process deleted value module 1508. In one embodiment, the process signal module 1502 processes a signal that a notification is available as described in FIG. 8B above. The process added value module 1504 processes that a value has been added as described in FIG. 9B above. The process value changed module 1506 processes that a value has changed as described in FIG. 10B above. The process value deleted module 1508 processes that a value has been added as described in FIG. 11B above.

Figure 16:
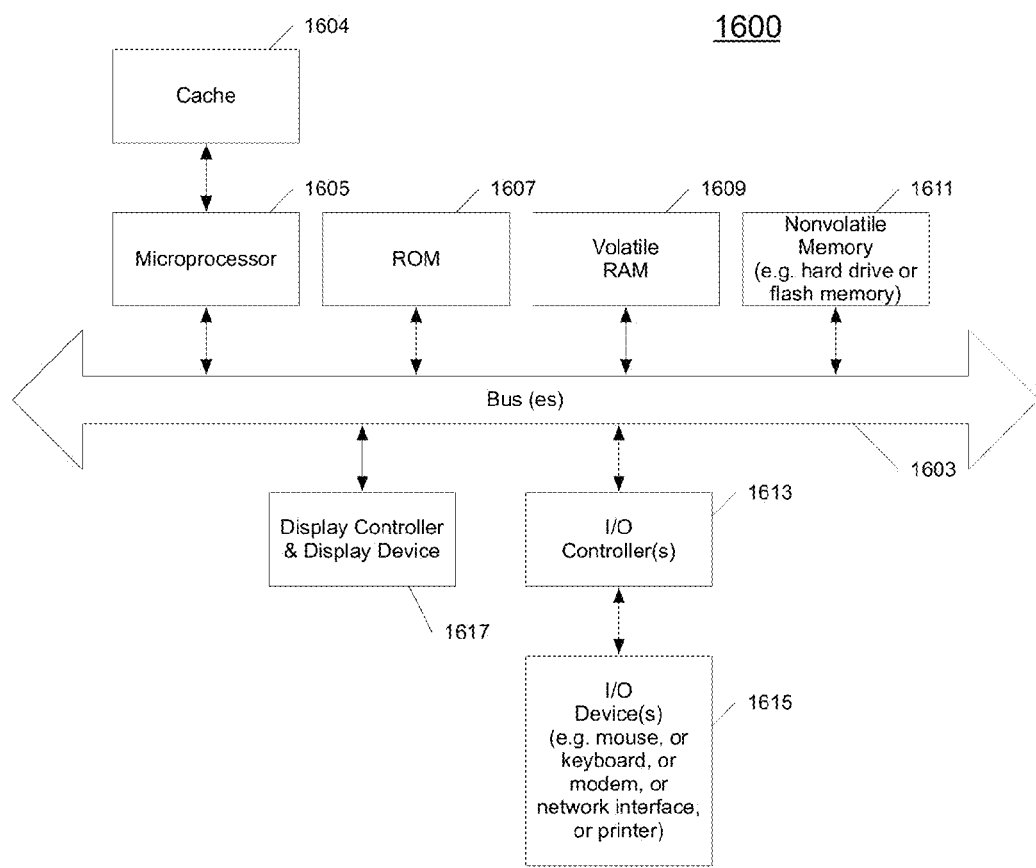
FIG. 16 illustrates one example of a typical computer system, which may be used in conjunction with the embodiments described herein.

FIG. 16 shows one example of a data processing system 1600, which may be used with one embodiment of the present invention. For example, the system 1600 may be implemented including a network element 100 as shown in FIG. 1. Note that while FIG. 16 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 16, the computer system 1600, which is a form of a data processing system, includes a bus 1603 which is coupled to a microprocessor(s) 1605 and a ROM (Read Only Memory) 1609 and volatile RAM 1609 and a non-volatile memory 1611. The microprocessor 1605 may retrieve the instructions from the memories 1607, 1609, 1611 and execute the instructions to perform operations described above. The bus 1603 interconnects these various components together and also interconnects these components 1605, 1607, 1609, and 1611 to a display controller and display device 1615 and to peripheral devices such as input/output (I/O) devices which may be mice, keyboards, modems, network interfaces, printers and other devices which are well known in the art. In one embodiment, the system 1600 includes a plurality of network interfaces of the same or different type (e.g., Ethernet copper interface, Ethernet fiber interfaces, wireless, and/or other types of network interfaces). In this embodiment, the system 1600 can include a forwarding engine to forward network date received on one interface out another interface.

Typically, the input/output devices 1615 are coupled to the system through input/output controllers 1619. The volatile RAM (Random Access Memory) 1609 is typically implemented as dynamic RAM (DRAM), which requires power continually in order to refresh or maintain the data in the memory.

The mass storage 1611 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1611 will also be a random access memory although this is not required. While FIG. 16 shows that the mass storage 1611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 17:
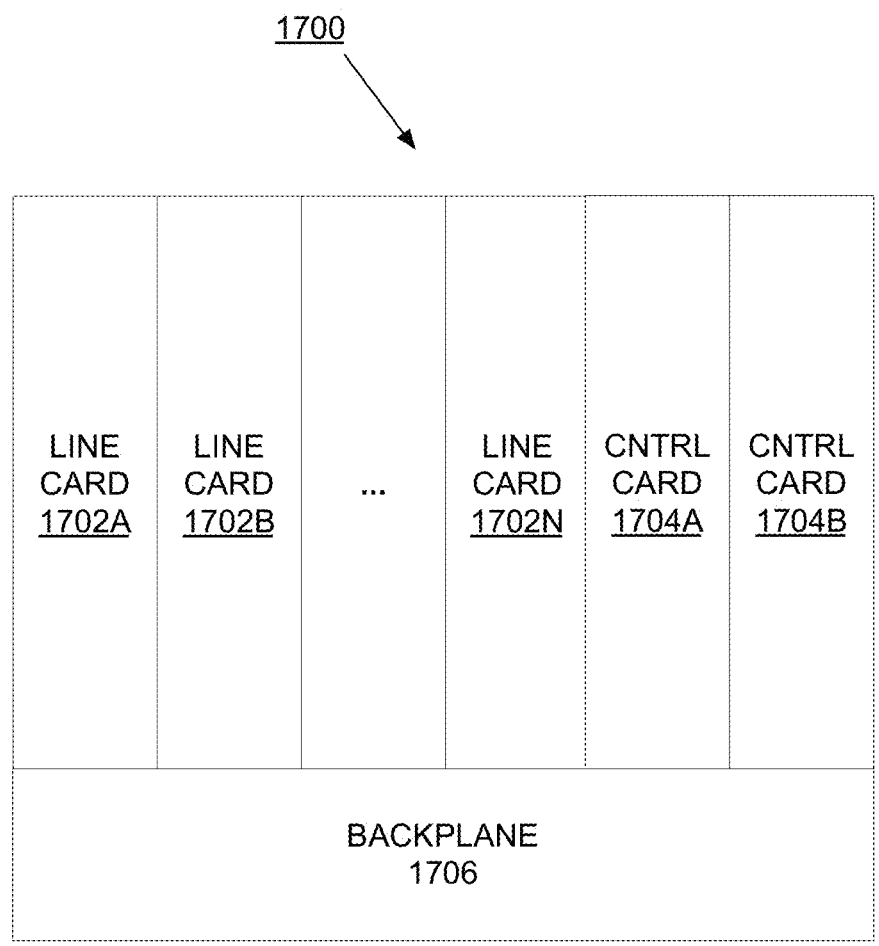
FIG. 17 is a block diagram of one embodiment of an exemplary network element that includes a shared memory hash table with notifications to readers for updates.

FIG. 17 is a block diagram of one embodiment of an exemplary network element 1700 that reads and writes data with a shared memory hash table using notifications. In FIG. 17, the backplane 1706 couples to the line cards 1702A-N and controller cards 1704A-B. While in one embodiment, the controller cards 1704A-B control the processing of the traffic by the line cards 1702A-N, in alternate embodiments, the controller cards 1704A-B, perform the same and/or different functions (e.g., writing data with a shared memory hash table using reader notifications, etc.). In one embodiment, the line cards 1702A-N process and forward traffic according to the network policies received from controller cards the 1704A-B. In one embodiment, the controller cards 1704A-B write data to the shared memory hash table using reader notifications as described in FIGS. 8A, 9A, 10A, and 11A. In this embodiment, one or both of the controller cards include a writer hash module to write data to the shared memory hash table using reader notifications, such as the writer 108 as described in FIG. 1 above. In another embodiment, the line cards 1702A-N read data from the shared memory hash table using notifications as described in FIGS. 8B, 9B, 10B, and 11B. In this embodiment, one or more of the line cards 1702A-N include the reader hash module to read data from the shared memory hash table using notifications, such as the reader 112A-C as described in FIG. 1 above. It should be understood that the architecture of the network element 1700 illustrated in FIG. 17 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "invalidating," "determining," "copying," "reading," "signaling," "identifying," "modifying," "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units perform a method to notify a reader that a value in a shared memory hash table has been modified, the method comprising:
    modifying a value in the shared memory hash table, where in the value has a corresponding key;
    storing a notification in a notification queue that indicates the value associated with the corresponding key has changed;
    invalidating one or more previous entries in the notification queue that corresponding to the key; and
    signaling to the reader that a notification is ready to be processed.

2. The non-transitory machine-readable medium of claim 1, wherein the modifying comprises:
    identifying a slot identifier for the key corresponding to the value, wherein the slot identifier references a slot entry in a slot table.

3. The non-transitory machine-readable medium of claim 2, wherein the slot includes a reference to the modified value.

4. The non-transitory machine-readable medium of claim 2, wherein the notification includes the slot identifier.

5. The non-transitory machine-readable medium of claim 2, wherein invalidating the one or more previous entries in the notification queue comprises:
    invalidating other notifications in the notification queue with the slot identifier.

6. The non-transitory machine-readable medium of claim 1, wherein storing the notification comprises:
    inserting the notification at a front of the notification queue.

7. The non-transitory machine-readable medium of claim 1, wherein the modifying is selected from the group of adding a value, deleting a value, and changing a value.

8. The non-transitory machine-readable medium of claim 1, wherein the reader updates a local copy of the value using the notification by reading from the shared memory hash table the value associated with the next key it reads from the notification queue.

9. The non-transitory machine-readable medium of claim 8, wherein the reader updates the local copy by reading a version associated with the key, reading a value corresponding with the key, and validating the version.

10. The non-transitory machine-readable medium of claim 1, wherein the signaling uses a kick mechanism that notifies the reader in response to the reader sending a notification that the reader is blocked and ready for new notifications.

11. The non-transitory machine-readable medium of claim 1, further comprising:
    compacting the notification queue if the notification queue is full without disrupting read access for the reader, wherein the compacting occurs by,
    creating a new notification queue;
    copying active slot identifier entries to the new notification queue; and
    notifying the reader to use the new notification queue.

12. The non-transitory machine-readable medium of claim 1, further comprising:
    auditing the notification queue to ensure valid entries, wherein the auditing occurs in response to a writer restarting.

13. A non-transitory machine-readable medium having executable instructions to cause one or more processing units perform a method to modify a local copy of a value in a shared memory hash table, the method comprising:
    receiving a signal that a notification is available in the notification queue, wherein the notification indicates that the value has been modified and the value has a corresponding the key;
    determining an entry in the notification queue for the value, wherein one or more previous entries in the notification queue corresponding to the key have been invalidated;
    modifying the local copy of the value based on comparing the value in the shared memory hash table and the local copy of the value.

14. The non-transitory machine-readable medium of claim 13, wherein the determining comprises:
    reading a next available slot identifier on the notification queue.

15. The non-transitory machine-readable medium of claim 14, wherein the determining further comprises:
    skipping over an invalidated entry in the notification queue.

16. The non-transitory machine-readable medium of claim 14, wherein the determining further comprises:
    reading the key associated with the slot identifier; and
    comparing the key with another key identified by the slot identifier in a shadow slot table.

17. A method to notify a reader that a value in a shared memory hash table has been modified, the method comprising:
    modifying a value in the shared memory hash table, where in the value has a corresponding key;
    storing a notification in a notification queue that indicates the value associated with the corresponding key has changed;
    invalidating one or more previous entries in the notification queue that corresponding to the key; and
    signaling to the reader that a notification is ready to be processed.

18. The method of claim 17, wherein the modifying comprises:

identifying a slot identifier for the key corresponding to the value, wherein the slot identifier references a slot entry in a slot table.

19. The method of claim 17, wherein storing the notification comprises:

inserting the notification at a front of the notification queue.

20. A network element that notifies a reader that a value in a shared memory hash table has been modified, the network element comprising:

a processor;

a memory coupled to the processor through a bus; and a process executed from the memory by the processor to cause the processor to modify a value in the shared memory hash table, where in the value has a corresponding key, store a notification in a notification queue that indicates the value associated with the corresponding key has changed, invalidate one or more previous entries in the notification queue that corresponding to the key; and signal to the reader that a notification is ready to be processed.

* * * * *